US006618478B1

(12) United States Patent
Stuckman et al.

(10) Patent No.: US 6,618,478 B1
(45) Date of Patent: Sep. 9, 2003

(54) TELEPHONE SET HAVING A HELP KEY AND METHODS AND SYSTEMS FOR USE THEREWITH

(75) Inventors: Bruce Edward Stuckman, Algonquin, IL (US); Wayne Robert Heinmiller, Elgin, IL (US); Karen Jeanne Pelletier, Crystal Lake, IL (US); Edmond W. Israelski, Lake Barrington, IL (US)

(73) Assignee: Ameritech Corporation, Hoffman Estates, IL (US)

( * ) Notice: Subject to any disclaimer, the term of this patent is extended or adjusted under 35 U.S.C. 154(b) by 0 days.

(21) Appl. No.: 09/406,215

(22) Filed: Sep. 27, 1999

(51) Int. Cl.[7] .............................................. H04M 1/00
(52) U.S. Cl. ................ 379/355.01; 379/52; 379/216.01
(58) Field of Search ........................... 379/355.01, 116, 379/52, 216.01

(56) References Cited

U.S. PATENT DOCUMENTS

| 4,727,567 | A | * | 2/1988 | Angelini ...................... 379/52 |
| 4,741,020 | A | | 4/1988 | Deal et al. |
| 4,908,602 | A | | 3/1990 | Reich et al. |
| 5,311,175 | A | * | 5/1994 | Waldman ...................... 341/34 |
| 5,388,251 | A | | 2/1995 | Makino et al. |
| 5,442,687 | A | | 8/1995 | Miller |
| 5,550,915 | A | * | 8/1996 | Partridge, III ......... 379/114.01 |
| 5,613,150 | A | | 3/1997 | Yamada |
| 5,710,551 | A | | 1/1998 | Ridgeway |
| 5,749,052 | A | | 5/1998 | Hidem et al. |
| 5,777,614 | A | | 7/1998 | Ando et al. |
| 5,802,304 | A | | 9/1998 | Stone |
| 5,831,598 | A | | 11/1998 | Kauffert et al. |
| 5,835,127 | A | | 11/1998 | Booth et al. |
| 5,864,603 | A | * | 1/1999 | Haavisto et al. ......... 379/88.01 |
| 5,895,903 | A | * | 4/1999 | Abe et al. ................... 235/380 |
| 5,978,468 | A | * | 11/1999 | Boakes ........................ 379/354 |
| 6,249,764 | B1 | * | 6/2001 | Kamae et al. ........... 704/270.1 |

OTHER PUBLICATIONS

Popular Mechanics (vol. 159, No. 4 Apr. 1983, p. 19.*

* cited by examiner

*Primary Examiner*—Ahmad F. Matar
*Assistant Examiner*—Rasha S Al-Aubaidi
(74) *Attorney, Agent, or Firm*—Brinks Hofer Gilson & Lione (57) ABSTRACT

A telephone set comprises a help key, a telephone service key to initiate a telephone service, and a logic circuit. The logic circuit detects a simultaneous actuation of the help key and the telephone service key, and in response thereto, retrieves help information specific to the telephone service.

25 Claims, 5 Drawing Sheets

TELEPHONE SET HAVING A HELP KEY AND METHODS AND SYSTEMS FOR USE THEREWITH

RELATED APPLICATION

The present application is related to the following patent application having the same assignee as the present application:

"SYSTEM AND METHOD FOR ACCESSING A MESSAGING SERVICE USING A SHORT DIALING SEQUENCE", having a first-named inventor of Tricia E. Henry, Ser. No. 09/052,480, filed Mar. 31, 1998, which was issued as U.S. Pat. No. 6,453,018 on Sep. 17, 2002.

The disclosure of the above related application is hereby incorporated by reference into the disclosure of the present application.

TECHNICAL FIELD

The present invention relates to methods and systems for providing help information for telephone sets.

BACKGROUND OF THE INVENTION

With the proliferation of advanced calling features, some individuals may find it difficult to remember how to activate and/or deactivate the features. For example, some individuals may have difficulty remembering that *66 initiates a repeat dialing feature, and *86 cancels the repeat dialing feature.

In an attempt to overcome this difficulty, some new telephone sets have keys dedicated to perform advanced calling functions. For example, some telephone sets may have a key dedicated to initiating a three-way calling feature, and a key dedicated to initiating a call forwarding feature.

While having feature-dedicated keys overcomes the need to remember feature codes (such as *66 and *86), some services such as three-way calling and call forwarding require a sequence of user-initiated actions to implement the feature. Some individuals may have difficulty remembering the sequence of actions to implement each feature.

U.S. Pat. No. 5,835,127 to Booth et al. discloses a telephone having a help button. The help button may be used to provide a help menu providing explanations to be read by a user.

U.S. Pat. No. 5,831,598 to Kauffert et al. discloses an ISDN (Integrated Services Digital Network) terminal capable of displaying a textual or acoustic explanation of a function key. In a disclosed implementation, a short actuation of a function key causes the function to be executed, and a longer actuation of the function key causes function key information to be provided. In another disclosed implementation, a first actuation of a function key causes function information to be provided, and a second actuation of the function key causes execution of the function.

Some facsimile machines have a dedicated help key. In response to a depression of the help key, a list of basic operating procedures is printed by the facsimile machine.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF PREFERRED EMBODIMENTS

Embodiments of the present invention provide a telephone set having one or more telephone service keys and a help key. A contemporaneous actuation (e.g. either a simultaneous actuation or a sequential actuation) of the help key and one of the telephone service keys by a user is detected. In response thereto, help information specific to a telephone service associated with the actuated one of the telephone service keys is retrieved and presented to the user.

The help information may be retrieved from a database within the telephone set. In this case, the help information specific to the actuated one of the telephone service keys is presented in an audible form using a telephone speaker, and/or in a visible, textual form using a telephone display unit.

Preferably, the help information is retrieved using a telephone network service. In this case, the help key provides access to the service. The service may lead the user, using either audio prompts and/or text prompts provided directly to the speaker and/or display unit, to instructions on how to implement a particular service or calling feature.

By operating the telephone set as disclosed herein: (a) help information specific to one of the telephone service keys, rather than a help menu for many telephone services, is provided to the user; (b) the acts required to get help information specific to any one of the telephone service keys may be more apparent to some users; and (c) an inadvertent execution of a function for which help information is desired may be less likely.

Figure 1:
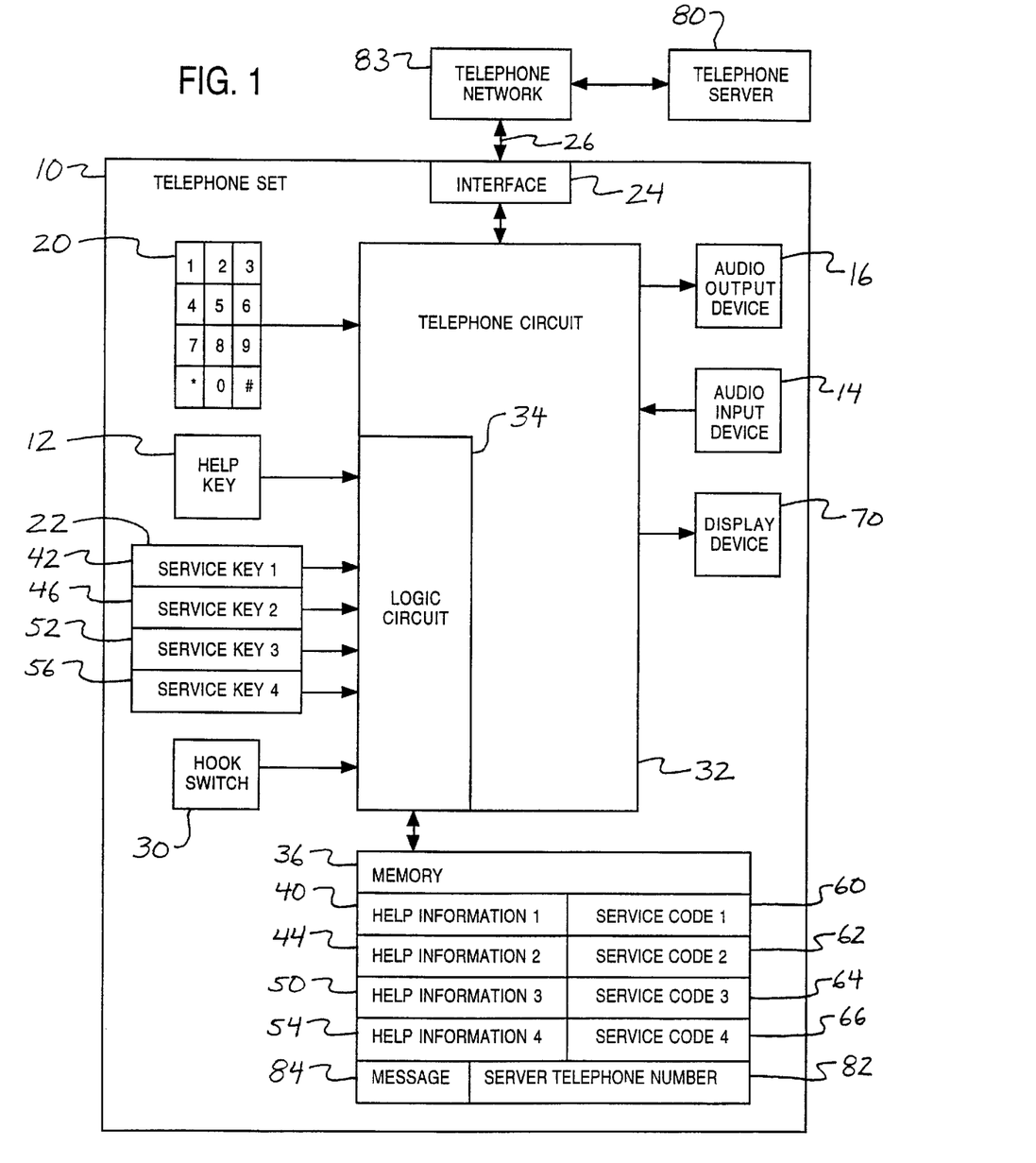
FIG. 1 is a block diagram of an embodiment of a telephone set having a help key.

FIG. 1 is a block diagram of an embodiment of a telephone set 10 having a help key 12. The telephone set 10 comprises an audio input device 14 and an audio output device 16. The audio input device 14 comprises a microphone or a like transducer to generate electrical signals based upon audible acoustic pressure waves sensed thereby. The audio output device 16 comprises a speaker or a like transducer to generate audible acoustic pressure waves based upon electrical signals applied thereto.

The audio input device 14 and the audio output device 16 may provide a hands-free audio interface (e.g. a speakerphone) for the telephone set, or may be integrated or otherwise associated with a handset of the telephone set. Alternatively, the audio input device 14 and the audio output device 16 can be associated with either a headset or another member which typically contacts an end user of the telephone set 10.

The telephone set 10 further comprises a plurality of telephone dialing keys 20. The telephone dialing keys 20 include dialing digit keys of "0" to "9", an asterisk "*" key, and a pound "#" key. Preferably, the telephone dialing keys 20 direct the generation of dual-tone multi-frequency (DTMF) signals.

The telephone set 10 further comprises a plurality of telephone service keys 22. Each of the telephone service keys 22 is used to initiate a corresponding telephone service. As subsequently described in more detail, the help key 12 is used to initiate retrieving help information specific to each corresponding telephone service.

The telephone set 10 further comprises an interface 24 to couple to a telephone line 26. The interface 24 can include one or more connectors to receive mating connectors associated with the telephone line 26. For example, the interface 24 can include an RJ11 jack to receive a corresponding RJ11 plug from the telephone line 26. The telephone line 26 may include a plain-old telephone service (POTS) line or another type of telephone line.

The telephone set 10 further comprises a hook switch 30. The hook switch 30 may be actuated proximate to a handset-receiving portion (not illustrated) of the telephone set 10. In this case, the handset-receiving portion preferably has the form of a cradle to receive and support a handset. Typically, although not necessary, the hook switch 30 is located at a portion of the cradle for supporting an ear end of the handset. When the handset is supported by the handset-receiving portion, the hook switch 30 is depressed. When the handset is removed from the handset-receiving portion, the hook switch 30 is released. As either an alternative to or in addition to being proximate to the handset-receiving portion, the hook switch 30 can include a key or a like control which is user-selectable.

A telephone circuit 32 is responsive to the help key 12, the telephone dialing keys 20, the telephone service keys 22 and the hook switch 30 to control the operation of the telephone set 10. To direct the various modes of operation, the telephone circuit 32 includes a logic circuit 34 such as microprocessor, a microcontroller, a programmable logic array, an application-specific integrated circuit, or discrete logic components. The logic circuit 34 is responsive to the help key 12, the telephone dialing keys 20, the telephone service keys 22 and the hook switch 30 to determine and initiate the mode of operation.

Figure 2:
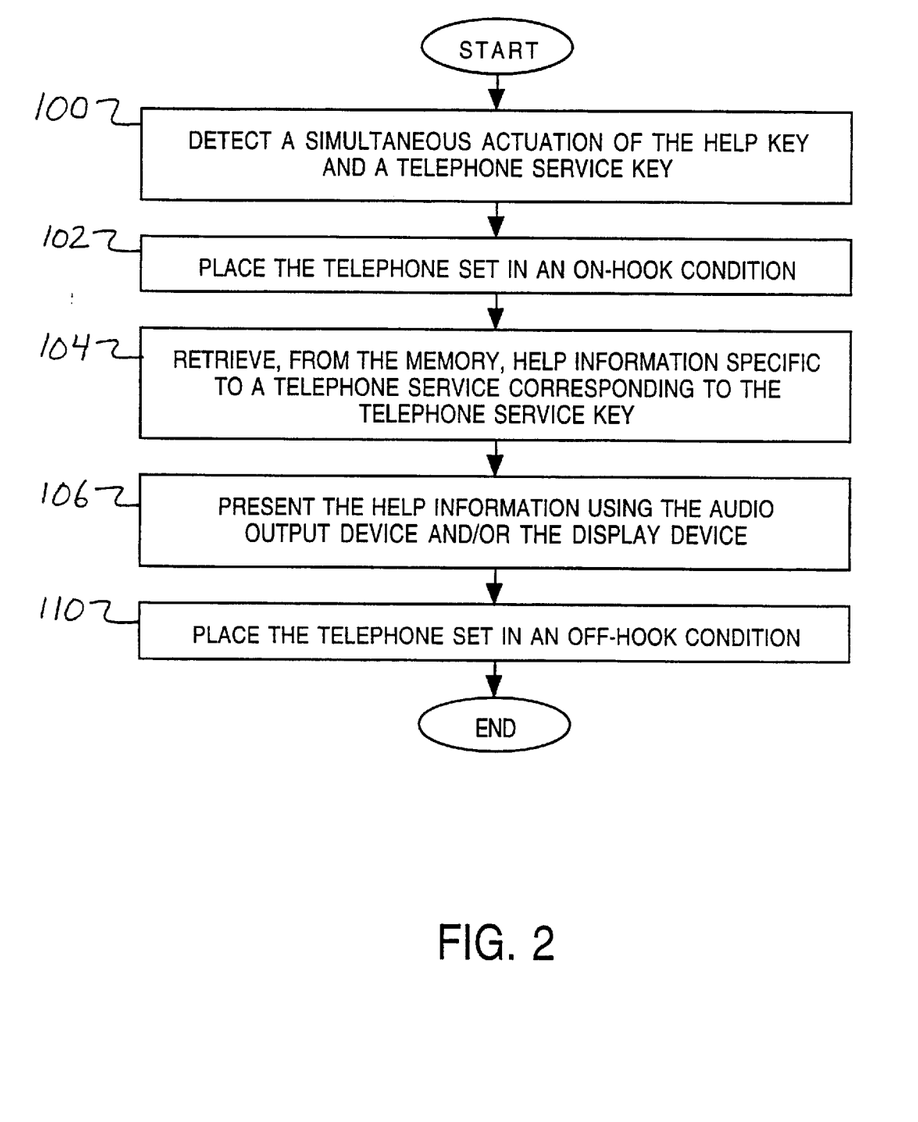
FIG. 2 is a flow chart of a first embodiment of a method of providing help information using a telephone set having a help key.
Figure 3:
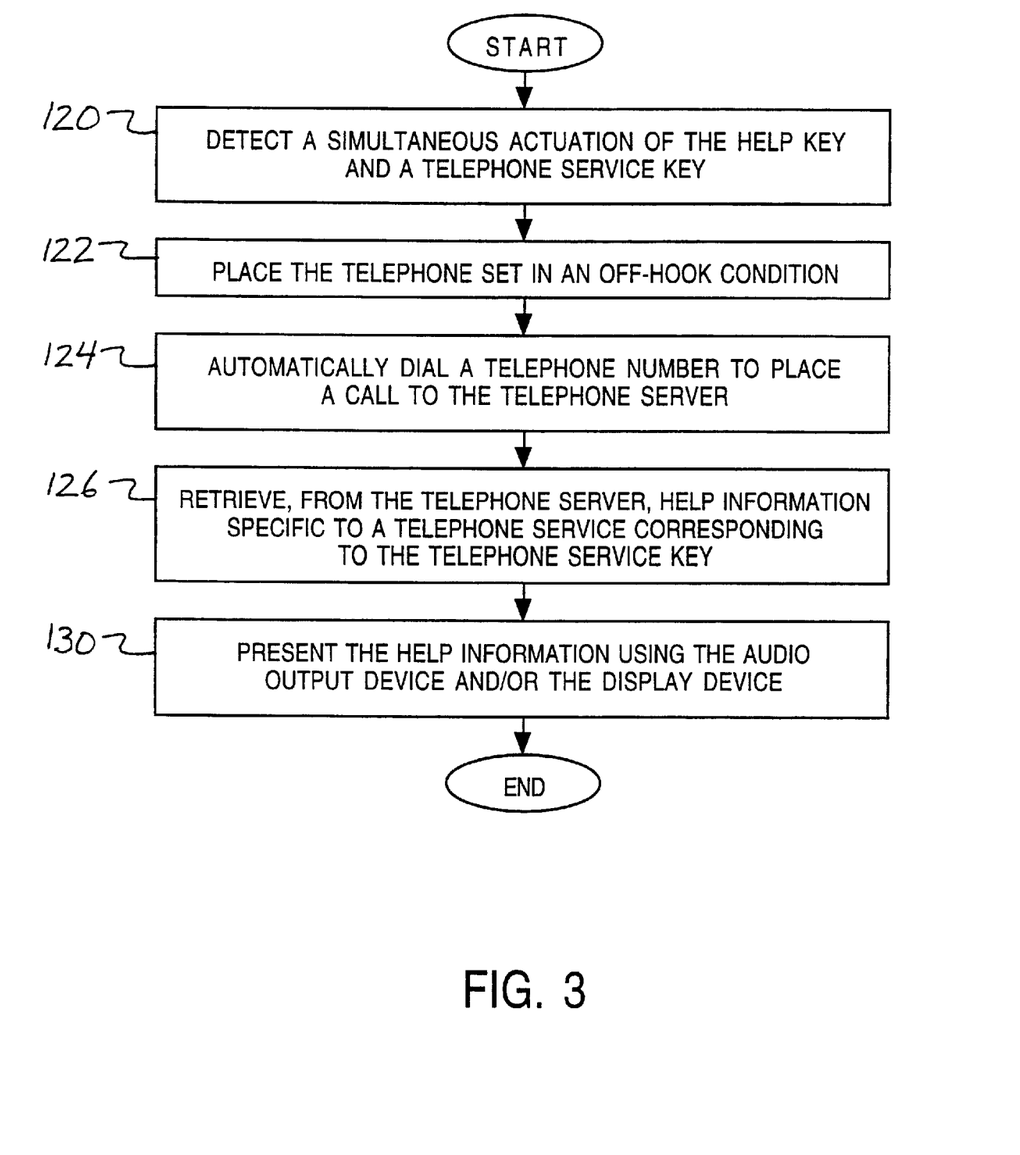
FIG. 3 is a flow chart of a second embodiment of a method of providing help information using a telephone set having a help key.

In some embodiments, the logic circuit 34 is capable of detecting a simultaneous actuation of the help key 12 and any of the telephone service keys 22. In response thereto, the logic circuit 34 initiates retrieval of help information specific to the telephone service associated with the actuated telephone service key. FIGS. 2 and 3 show embodiments of operating the telephone set 10 in this manner.

The help information may be retrieved locally from a memory 36 of the telephone set 10. The memory 36 may comprise either an electronic memory, an optical memory, or an electromagnetic memory, for example.

The memory 36 stores help information specific to each of the telephone service keys 22. For example, the memory 36 may have first help information 40 specific to a first telephone service associated with a first telephone service key 42, second help information 44 specific to a second telephone service associated with a second telephone service key 46, third help information 50 specific to a third telephone service associated with a third telephone service key 52, and fourth help information 54 specific to a fourth telephone service associated with a fourth telephone service key 56.

The memory 36 also may store a corresponding telephone service code associated with each of the telephone service keys 22. For example, the memory 36 may have a first telephone service code 60 to initiate the first telephone service associated with the first telephone service key 42, a second telephone service code 62 to initiate the second telephone service associated with the second telephone service key 46, a third telephone service code 64 to initiate the third telephone service associated with the third telephone service key 52, and a fourth telephone service code 66 to initiate the fourth telephone service associated with the fourth telephone service key 56.

Each of at least a subset of the telephone service codes may comprise a three-digit service code, such as a vertical service code. As is well-known, some vertical service codes may include a first digit, a second digit, and an asterisk "*" prefixing the first digit and the second digit. Other service codes may include a first digit, a second digit, and a pound "#" following the first digit and the second digit.

It is noted that the telephone set 10, in general, may comprise any number of telephone service keys, and the memory 36 may store associated help information and service codes for any number of corresponding telephone services.

For purposes of illustration and example, consider the first telephone service key 42 being for a call-forwarding service, the second telephone service key 46 being for a cancel-call-forwarding service, the third telephone service key 52 being for a cancel-calling-number-delivery service, and the fourth telephone service key 56 being for a directory-assistance service. The first telephone service code 60 comprises "72#", the second telephone service code 62 comprises "73#", the third telephone service code 64 comprises "*67", and the fourth telephone service code 66 comprises "411".

The first help information 40 may comprise a message such as: "The call forwarding service is used to forward calls to another number. After pressing the call forwarding key, listen for a dial tone. Thereafter, dial the number which is to receive your forwarded calls. You will hear two short tones, followed by ringing to confirm your request. When the number is answered, call forwarding is on. If no one answers or the line is busy, repeat the steps. This will set up call forwarding without anyone answering at the number."

The second help information 44 may comprise a message such as: "This key cancels call forwarding. After pressing this key, you will hear two tones indicating that call forwarding has been canceled."

The third help information 50 may comprise a message such as: "The call block service cancels the delivery of your calling number to a caller identification unit of a called party. To use this service, press the call block key prior to dialing the telephone number of a destination party."

The fourth help information 54 may comprise a message such as: "This key will connect you to a directory assistance service which may be used to obtain telephone numbers."

FIG. 2 is a flow chart of a first embodiment of a method of providing help information using a telephone set having a help key. In response to detecting a simultaneous actuation of the help key 12 and one of the telephone service keys 22 (block 100), the logic circuit 34 directs: (a) the telephone circuit 32 to place the telephone set 10 in an on-hook condition with respect to the interface 24 (block 102); (b) retrieval, from the memory 36, of help information specific to a telephone service corresponding to the actuated one of the telephone service keys 22 (block 104); and (c) audible presentation of the help information using the audio output device 16 and/or visible presentation of the help information using a display device 70 (block 106). The telephone set 10 is placed in the on-hook condition, regardless of the state of the hook switch 30, to inhibit initiating the telephone service corresponding to the actuated one of the telephone service keys 22, and to inhibit either a dial tone or other audio received from the interface 24 from being outputted by the audio output device 16.

Thereafter, if the hook switch 30 indicates a desired off-hook condition, the logic circuit 34 directs the telephone circuit 32 to place the telephone set 10 in the off-hook condition (block 110). In this way, an end user, after hearing the help information, may initiate a telephone service by depressing or otherwise actuating one of the telephone service keys 22 without simultaneously actuating the help key 12, and/or may place a telephone call in a conventional manner using the telephone dialing keys 20.

FIG. 3 is a flow chart of a second embodiment of a method of providing help information using a telephone set having a help key. In this embodiment, the help information is retrieved remotely from a telephone server 80 in FIG. 1 as an alternative to retrieving the help information locally. The telephone server 80 may comprise an IVR (interactive voice response) unit, for example, having help information such as the help information 40, 44, 50 and 54 described with reference to the memory 36. The telephone server 80 may comprise either a telephone network element or an element external to, but accessible via a telephone network.

In response to detecting a simultaneous actuation of the help key 12 and one of the telephone service keys 22 (block 120), the logic circuit 34 directs: (a) the telephone circuit 32 to place the telephone set 10 in an off-hook condition with respect to the interface 24 (block 122); (b) automatic dialing of a telephone number 82 stored by the memory 36 to place a call to the telephone server 80 via a telephone network 83 (block 124); (c) retrieval, from the telephone server 80, of help information specific to a telephone service corresponding to the actuated one of the telephone service keys 22 (block 126); and (d) audible presentation of the help information using the audio output device 16 and/or visible presentation of the help information using the display device 70 (block 130). The telephone network 83 may comprise a public switched telephone network (PSTN) or another type of network.

After hearing the help information, the end user may terminate the call with the telephone server 80. Thereafter, the end user may initiate a telephone service by depressing or otherwise actuating one of the telephone service keys 22 without simultaneously actuating the help key 12, and/or may place a telephone call in a conventional manner using the telephone dialing keys 20.

Figure 4:
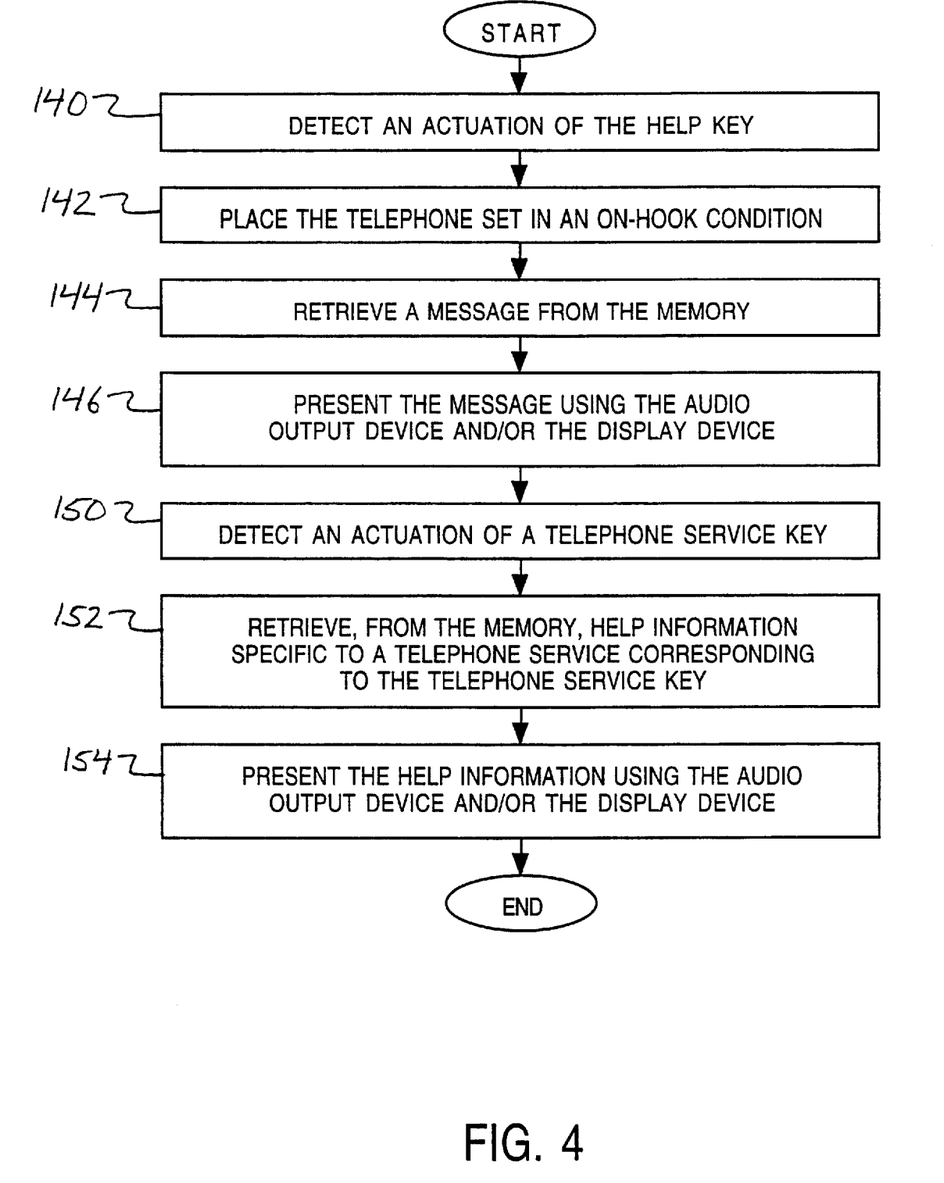
FIG. 4 is a flow chart of a third embodiment of a method of providing help information using a telephone set having a help key.
Figure 5:
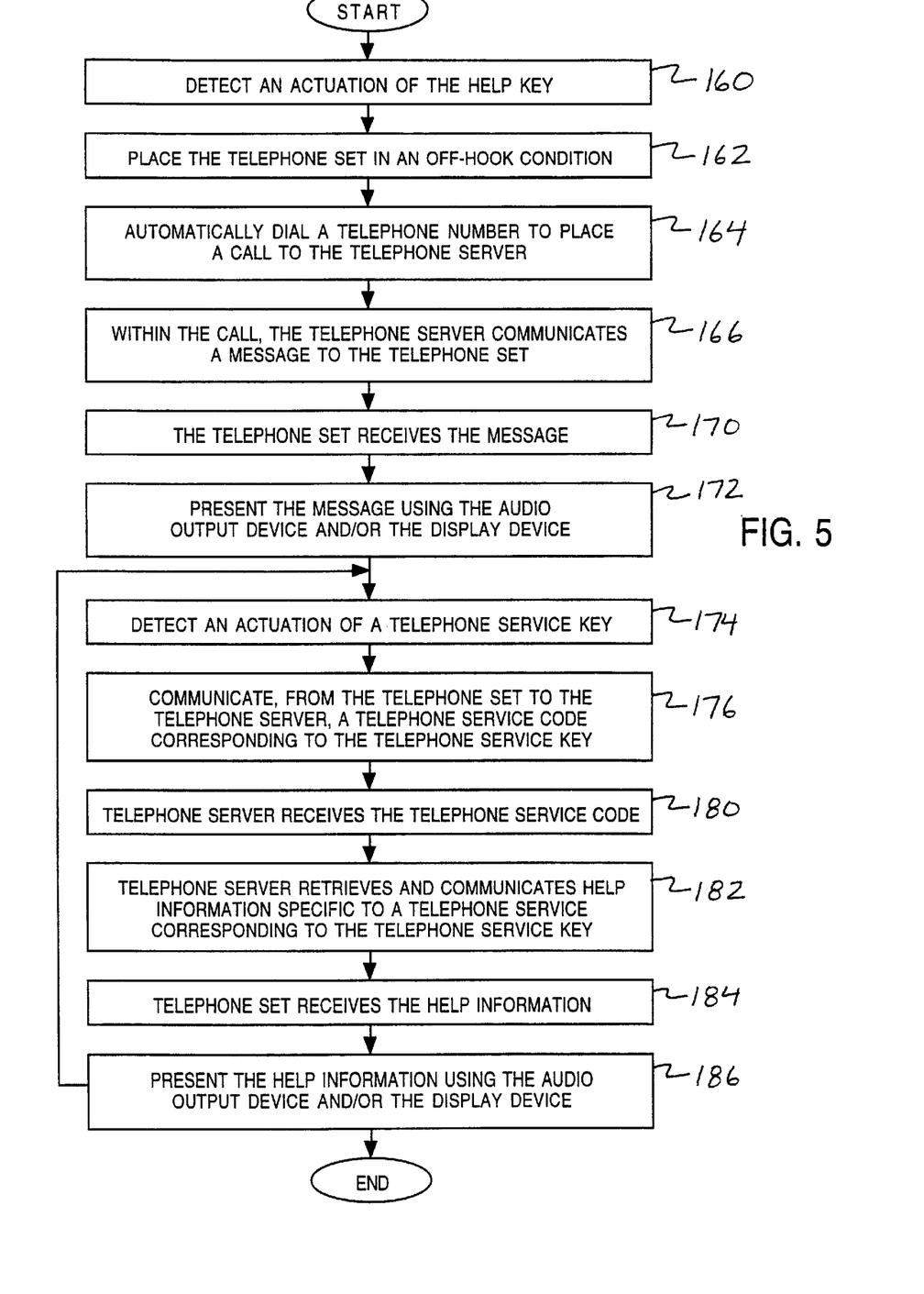
FIG. 5 is a flow chart of a fourth embodiment of a method of providing help information using a telephone set having a help key.

In other embodiments, help information is retrieved in response to detecting actuation of the help key 12 followed by actuation of any of the telephone service keys 22. Typically, in these cases, the help key 12 is actuated and released before actuating one of the telephone service keys 22. FIGS. 4 and 5 show embodiments of methods of operating the telephone set 10 in this manner.

FIG. 4 is a flow chart of a third embodiment of a method of providing help information using a telephone set having a help key. In this embodiment, the help information is retrieved locally from the memory 36.

As indicated by block 140, in response to detecting an actuation of the help key 12, the logic circuit 34 directs: (a) the telephone circuit 32 to place the telephone set 10 in an on-hook condition with respect to the interface 24, regardless of the state of the hook switch 30 (block 142); (b) retrieval, from the memory 36, of a message 84 such as "please depress the service key for which help information is desired" (block 144); and (c) audible presentation of the message using the audio output device 16 and/or visible presentation of the message using the display device 70 (block 146). The telephone set 10 is placed in the on-hook condition to inhibit initiating a telephone service corresponding to one of the telephone service keys 22 for which help information is desired, and to inhibit either a dial tone or other audio received from the interface 24 from being outputted by the audio output device 16.

Thereafter, in response to detecting an actuation of one of the telephone service keys 22 (block 150), the logic circuit 34 directs: (d) retrieval, from the memory 36, of help information specific to a telephone service corresponding to the actuated one of the telephone service keys 22 (block 152); and (e) audible presentation of the help information using the audio output device 16 and/or visible presentation of the help information using the display device 70 (block 154).

Thereafter, if the hook- switch 30 indicates a desired off-hook condition, the logic circuit 34 directs the telephone circuit 32 to place the telephone set 10 in the off-hook condition. In this way, an end user, after hearing the help information, may initiate a telephone service by depressing or otherwise actuating one of the telephone service keys 22, and/or may place a telephone call in a conventional manner using the telephone dialing keys 20.

FIG. 5 is a flow chart of a fourth embodiment of a method of providing help information using a telephone set having a help key. In this embodiment, the help information is retrieved remotely from the telephone server 80.

As indicated by block 160, in response to detecting an actuation of the help key 12, the logic circuit 34: (a) directs the telephone circuit 32 to place the telephone set 10 in an off-hook condition with respect to the interface 24 (block 162); and (b) automatically dials the telephone number 82 to place a call to the telephone server 80 (block 164). Within the call, the telephone server 80 may communicate a message, such as "please depress the service key for which help information is desired" (block 166). The message is received by the telephone set 10 via the interface 24 (block 170), and audibly presented using the audio output device 16 (block 172).

Thereafter within the call, the end user may actuate one of the telephone service keys 22 (block 174). In response thereto, the telephone circuit 32 communicates a telephone service code corresponding to the actuated one of the telephone service keys 22 (block 176).

The telephone service code is received by the telephone server 80 (block 180). In response thereto, the telephone server 80 retrieves and communicates help information specific to a telephone service corresponding to the actuated one of the telephone service keys 22 (block 182). The help information is received by the telephone set 10 (block 184), and is audibly presented using the audio output device 16 (block 186).

After hearing the help information, the end user may actuate another of the telephone service keys 22 to retrieve additional help information within the call, or may terminate the call with the telephone server 80. Thereafter, the end user may initiate a telephone service by depressing or otherwise actuating one of the telephone service keys 22, and/or may place a telephone call in a conventional manner using the telephone dialing keys 20.

To illustrate uses of embodiments of the telephone set 10, consider the following two examples. In a first example, the telephone set 10 is operative to function based on the method described with reference to FIG. 2. In a second example, the telephone set 10 is operative to function based on the method described with reference to FIG. 5.

In the first example, the end user removes a handset from a handset-receiving portion of the telephone set 10. In response thereto, the telephone set 10 is placed in an off-hook condition, and the end user hears a dial tone outputted by the audio output device 16.

The end user wishes to place a telephone call using the cancel-calling-number-delivery feature, but is unsure whether to depress the corresponding telephone service key 52 before or after dialing a telephone number. To retrieve the help information 50 specific to the cancel calling number delivery feature, the end user simultaneously depresses the help key 12 and the telephone service key 52. In response thereto, the telephone set 10 is automatically placed in an on-hook condition, the help information 50 is retrieved from the memory 36, and the help information 50 is audibly outputted by the audio output device 16.

The end user hears the help information 50, which indicates that the telephone service key 52 should be depressed prior to dialing the telephone number. Thereafter, the telephone set 10 is placed back in an off-hook condition, and the end user hears the dial tone outputted by the audio output device 16. The end user depresses the telephone service key 52, which causes the telephone service code 64 to be dialed. Thereafter, the end user dials the telephone number using the telephone dialing keys 20. The telephone call is placed to the telephone number via the telephone network 83 with calling number delivery being blocked. The telephone call is conducted using the audio input device 14 and the audio output device 16.

In the second example, the end user wishes to forward his/her calls to another telephone number, but is unsure about the process. To retrieve help information, the end user depresses the help key 12. In response thereto, the telephone set 10 is automatically placed in a hands-free, speakerphone mode. Further, the telephone set 10 is automatically placed in an off-hook condition, and the telephone number 82 is automatically dialed.

The telephone server 80 answers the call from the telephone set 10, and communicates audio prompts to the telephone set 10. The audio prompts are received by the telephone set 10 and made audible by the audio output device 16.

The end user depresses the telephone service key 42 corresponding to the call-forwarding service, which causes the telephone service code 60 to be dialed. The telephone server 80 receives the telephone service code 60. In response thereto, the telephone server 80 retrieves help information specific to the call-forwarding service, and communicates the help information to the telephone set 10. The help information is received by the telephone set 10 and made audible by the audio output device 16.

Thereafter within the call, the end user is interested in learning how to cancel the call-forwarding service. The end user depresses the telephone service key 46 corresponding to the cancel-call-forwarding service, which causes the telephone service code 62 to be dialed. The telephone server 80 receives the telephone service code 62. In response thereto, the telephone server 80 retrieves help information specific to the cancel-call-forwarding service, and communicates the help information to the telephone set 10. The help information is received by the telephone set 10 and made audible by the audio output device 16.

Thereafter, the end user terminates the telephone call. After terminating the telephone call, the end user depresses the telephone service key 42, and uses the telephone dialing keys 20 to set up call forwarding in accordance with the instructions given by the telephone server 80.

It is noted that the herein-described methods can be directed by a computer-readable storage medium having computer-readable data. The computer-readable storage medium can include either a magnetic storage medium such as a magnetic disk, an electronic storage medium such as a memory, or an optical storage medium such as an optical disk. The logic circuit 34 and/or the telephone server 80 may have a processor responsive to the computer-readable data to perform the herein-described methods.

It is also noted that the telephone server 80 may be accessible using either a 7-digit telephone number, a 10-digit telephone number, or a dialing sequence shorter than 7 digits. An embodiment of a system and method to access the telephone server 80 using a dialing sequence shorter than 7 digits is disclosed in the above-identified related application which is incorporated by reference herein.

Thus, there has been described herein a concept, as well as several embodiments including preferred embodiments of a telephone set having a help key and methods and systems for use therewith.

Embodiments of the present invention make accessing telecommunication services and advanced features easier for users, particularly first-time users and infrequent users.

It will be apparent to those skilled in the art that the disclosed invention may be modified in numerous ways and may assume many embodiments other than the preferred form specifically set out and described above. For example, the telephone set 10 may comprise a wireless telephone as an alternative to a wireline telephone.

Accordingly, it is intended by the appended claims to cover all modifications of the invention which fall within the true spirit and scope of the invention.

What is claimed is:

1. A telephone set comprising:

a help key;

a first telephone service key to initiate a first telephone service; and a logic circuit to detect a simultaneous actuation of the help key and the first telephone service key, and in response thereto, to retrieve help information specific to the first telephone service, wherein the help information comprises a message explaining a function of the first telephone service key.

2. The telephone set of claim 1 further comprising a second telephone service key to initiate a second telephone service, wherein the logic circuit is to detect a simultaneous actuation of the help key and the second telephone service key, and in response thereto, to retrieve help information specific to the second telephone service.

3. The telephone set of claim 1 further comprising a memory having the help information.

4. The telephone set of claim 1 further comprising an audio output device to audibly present the help information.

5. The telephone set of claim 1 further comprising a plurality of telephone dialing keys including ten digit keys, a pound key, and an asterisk key.

6. The telephone set of claim 1 further comprising a display device to visibly present the help information.

7. A telephone set comprising:

an audio output device;

a plurality of keys comprising a help key, a first telephone service key to initiate a first telephone service, a second telephone service key to initiate a second telephone service, and a plurality of dialing keys, the plurality of dialing keys comprising ten digit keys, a pound key, and an asterisk key;

a memory having first help information specific to the first telephone service and second help information specific to the second telephone service, wherein the at least one of the first help information and the second help information comprises a message explaining a function of at least one of the first telephone service key and the second telephone service key; and a logic circuit responsive to the keys to retrieve the first help information for audible presentation using the audio output device in response to detecting a simultaneous actuation of the help key and the first telephone service key, to retrieve the second help information for audible presentation using the audio output device in response to detecting a simultaneous actuation of the help key and the second telephone service key, to dial a first vertical service code associated with the first telephone service in response to detecting actuation of the first telephone service key and non-actuation of the help key, and to dial a second vertical service code associated with the second telephone service in response to detecting actuation of the second telephone service key and non-actuation of the help key.

8. A system comprising:

a telephone server having help information specific to a first telephone service, and a telephone set comprising a help key and a first telephone service key to initiate the first telephone service, the telephone set to place a telephone call to the telephone server in response to an actuation of the help key, and to transmit a first telephone service code within the telephone call in response to an actuation of the first telephone service key, wherein the help information comprises a message explaining a function of the first telephone service key;

wherein the telephone server is to receive the first telephone service code within the telephone call, and in response thereto, to provide help information specific to the first telephones service within the telephone call.

9. The system of claim 8 wherein the telephone set further comprises a second telephone service key to initiate a second telephone service, wherein the telephone set is to transmit a second telephone service code within the telephone call in response to an actuation of the second telephone service key, and wherein the telephone server is responsive to receiving the second telephone service code to provide help information specific to the second telephone service within the telephone call.

10. The system of claim 8 wherein the telephone set further comprises an audio output device to audibly present the help information.

11. The system of claim 8 wherein the telephone set further comprises a plurality of telephone dialing keys including ten digit keys, a pound key, and an asterisk key.

12. The system of claim 8 wherein the telephone set further comprises a display device to visibly present the help information.

13. A method comprising:

(a) providing a telephone set comprising a help key and a first telephone service key to initiate a first telephone service;

(b) detecting a simultaneous actuation of the help key and the first telephone service key; and (c) retrieving help information specific to the first telephone service based on act (b), wherein the help information comprises a message explaining a function of the first telephone service key.

14. The method of claim 13 wherein the telephone set further comprises a second telephone service key to initiate a second telephone service, the method further comprising:

(d) detecting a simultaneous actuation of the help key and the second telephone service key; and (e) retrieving help information specific to the second telephone service based on act (d).

15. The method of claim 13 further comprising:

(d) audibly presenting the help information.

16. The method of claim 13 further comprising:

(d) visibly presenting the help information.

17. A method comprising:

providing a telephone set comprising an audio output device, a memory, and a plurality of keys, the plurality of keys comprising a help key, a first telephone service key to initiate a first telephone service, a second telephone service key to initiate a second telephone service, and a plurality of dialing keys, the plurality of dialing keys comprising ten digit keys, a pound key, and an asterisk key, the memory having first help information specific to the first telephone service and second help information specific to the second telephone service;

retrieving the first help information for audible presentation using the audio output device in response to detecting a simultaneous actuation of the help key and the first telephone service key, wherein the first help information comprises a message explaining a function of the first telephone service key;

dialing a first vertical service code associated with the first telephone service in response to detecting an actuation of the first telephone service key and non-actuation of the help key;

retrieving the second help information for audible presentation using the audio output device in response to detecting a simultaneous actuation of the help key and the second telephone service key, wherein the second help information comprises a message explaining a function of the second telephone service key; and dialing a second vertical service code associated with the second telephone service in response to detecting an actuation of the second telephone service key and non-actuation of the help key.

18. A method comprising:

providing a telephone set comprising a help key and a first telephone service key;

placing a telephone call to a telephone server in response to an actuation of the help key;

communicating, within the telephone call to the telephone server, a first telephone service code in response to an actuation of the first telephone service key; and receiving, at the telephone server, the first telephone service code within the telephone call, and in response thereto, providing help information specific to the first telephone service within the telephone call, wherein the help information comprises a message explaining a function service key.

19. The method of claim 18 wherein the telephone set further comprises a second telephone service key to initiate a second telephone service, the method further comprising:

communicating, within the telephone call to the telephone server, a second telephone service code in response to an actuation of the second telephone service key; and receiving, at the telephone server, the second telephone service code within the telephone call, and in response thereto, providing help information specific to the second telephone service within the telephone call.

20. The method of claim 18 wherein the telephone set further comprises an audio output device, the method further comprising audibly presenting the help information using the audio output device.

21. The method of claim 18 wherein the telephone set further comprises a display device, the method further comprising visibly presenting the help information using the display device.

22. A computer-readable medium whose contents cause a telephone set, comprising a help key and a first telephone service key to initiate a first telephone service, to detect a simultaneous actuation of the help key and the first telephone service key, and to retrieve help information specific to the first telephone service based thereon, wherein the help information comprises a message explaining a function of the first telephone service key.

23. The computer-readable medium of claim 22 wherein the telephone set further comprises a second telephone service key to initiate a second telephone service, and wherein the contents further cause the telephone set to detect a simultaneous actuation of the help key and the second telephone service key, and to retrieve help information specific to the second telephone service based thereon.

24. The computer-readable medium of claim 22 wherein the contents further cause the telephone set to audibly present the help information.

25. The computer-readable medium of claim 22 wherein the contents further cause the telephone set to visibly present the help information.

* * * * *

UNITED STATES PATENT AND TRADEMARK OFFICE
CERTIFICATE OF CORRECTION

PATENT NO. : 6,618,478 B1
DATED : September 9, 2003
INVENTOR(S) : Bruce E. Stuckman et al.

It is certified that error appears in the above-identified patent and that said Letters Patent is hereby corrected as shown below:

Column 9,
Line 45, delete "telephones" and substitute -- telephone -- in its place.

Column 10,
Line 64, after "function" insert -- of the first telephone --.

Signed and Sealed this

Thirteenth Day of July, 2004

JON W. DUDAS
*Acting Director of the United States Patent and Trademark Office*